(12) United States Patent
Jeong

(10) Patent No.: US 7,472,963 B2
(45) Date of Patent: Jan. 6, 2009

(54) RECLINER LEVER ASSEMBLY FOR A FRONT SEAT OF A VEHICLE

(75) Inventor: Dong Woo Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 328 days.

(21) Appl. No.: 11/300,162

(22) Filed: Dec. 13, 2005

(65) Prior Publication Data
US 2007/0102988 A1 May 10, 2007

(30) Foreign Application Priority Data
Nov. 4, 2005 (KR) .............. 10-2005-0105514

(51) Int. Cl.
*A47C 31/00* (2006.01)
(52) U.S. Cl. .................................. 297/463.1
(58) Field of Classification Search ............. 297/463.1, 297/183.1, 183.4, 344.12, 354.1; 16/DIG. 30, 16/110.1; 74/469, 491, 519, 543
See application file for complete search history.

(56) References Cited

U.S. PATENT DOCUMENTS

| | | | | |
|---|---|---|---|---|
| 4,615,232 A | * | 10/1986 | Puppala | 74/473.11 |
| 5,282,395 A | * | 2/1994 | LaPointe et al. | 74/523 |
| 2002/0084688 A1 | * | 7/2002 | Mitsuhiro | 297/463.1 |

FOREIGN PATENT DOCUMENTS

| | | |
|---|---|---|
| JP | 05-329030 | 12/1993 |
| JP | 06-219192 | 8/1994 |
| JP | 08-268125 | 10/1996 |
| KR | 1997-0000206 | 1/1997 |
| KR | 1020020055680 | 7/2002 |

\* cited by examiner

*Primary Examiner*—Milton Nelson, Jr.
(74) *Attorney, Agent, or Firm*—Morgan, Lewis & Bockius LLP

(57) ABSTRACT

A recliner lever assembly for a front seat of a vehicle has a recliner lever integrally assembled with a seat-height adjusting lever for the front seat with an identical hinge shaft, thereby preventing a passenger seated in the seat from being injured by an interference of a seat belt.

4 Claims, 2 Drawing Sheets

RECLINER LEVER ASSEMBLY FOR A FRONT SEAT OF A VEHICLE

CROSS-REFERENCE TO RELATED APPLICATION

This application claims priority to and the benefit of Korean Patent Application 10-2005-0105514 filed in the Korean Intellectual Property Office on Nov. 4, 2005, the entire content of which is incorporated herein by reference.

BACKGROUND OF THE INVENTION

1. Field of the Invention

The present invention relates to a recliner lever assembly for a front seat of a vehicle, and more particularly to a recliner lever assembly for a front seat of a vehicle, which has a recliner lever integrally assembled with a seat-height adjusting lever with an identical hinge shaft, thereby preventing a passenger seated in the seat from being injured by an interference of a seat belt.

2. Description of the Related Art

Generally, seats for a vehicle have been installed in the vehicle to elastically support a driver's or a passenger's body, to reduce a fatigue of the driver or the passenger resulting from an operation of the vehicle, and to provide a comfortable driving condition.

The seats for the vehicle include front-seats for a driver and a passenger, and a rear seat positioned behind the front-seats.

Each front-seat includes a seat cushion coupled to a floor panel so as to move in forward and backward directions, a seatback coupled to a rear portion of the seat cushion so as to be adjusted to the desired tilt angle, and a headrest mounted on an upper portion of the seatback.

The rear-seat is a bench type rear seat, which includes a rear-seat cushion coupled to the floor panel of the vehicle and a seatback joined with a rear portion of the rear-seat cushion.

The position of the seat for the vehicle can be changed to a certain extent to accommodate the passenger's or driver's figure including height, weight, arm length and the like, so as to prevent the driver or the passenger from fatiguing during the operation of the vehicle.

The seats respectively have at least one seatbelt to restrain the driver's figure or the passenger's figure in the event of the car crashing or turning over, in order to secure the driver's safety or the passenger's safety. The seatbelt is associated with a buckle so as to restrain the driver's figure or the passenger's figure.

On the other hand, when the driver or the passenger intends to use the seatbelt, the driver or the passenger sits in the front-seat and pulls a webbing of the seatbelt, so that the webbing of the seatbelt is drawn out of a retractor (not shown) while covering or winding about the recliner lever.

As described above, in the event of the car crashing, if this occurs during the operation of the vehicle in the state that the webbing of the seatbelt covers the recliner lever, the passenger can be instantly and forwardly moved by the impact caused by the car crashing, so as to lose balance.

In the circumstance as described above, when the seatbelt normally operates, the seatbelt restraining the driver's or passenger's body extends by a distance proportional to the movement of the driver's or passenger's body, so as to hold back the driver's or passenger's body into the front-seat to the original restrained position. However, since the webbing of the seatbelt covers or is wound around the recliner lever, the webbing of the seatbelt may tighten the driver's or passenger's body.

In addition, the webbing of the seatbelt may pull up the recliner lever so as to release restriction of the seatback. Thus, the seatback of the front-seat may rotate in one direction. Specially, in the event of the car crash, such a rotation in one direction may increase the risk of an injury to the driver or the passenger.

SUMMARY OF THE INVENTION

Accordingly, the present invention has been developed in order to solve the above-mentioned problems occurring in the prior art, and an object of the present invention is to provide a recliner lever assembly for a front seat of a vehicle, which has a recliner lever integrally assembled with a seat-height adjusting lever with an identical hinge shaft, so as to prevent the webbing of a seatbelt from covering and being wound on the recliner lever in a state where a driver or a passenger seated in the front seat of the vehicle wears the seatbelts, thereby decreasing the possible risks of an injury to the driver or the passenger in the event of a car accident.

In order to accomplish the object of the present invention, there is provided a recliner lever assembly for a front-seat of a vehicle, which comprises: a seat-height adjusting lever installed to a lower portion of a seat frame of the front-seat of the vehicle so as to be capable of being rotated around a hinge shaft, and having a receiving portion; a recliner lever integrally assembled with the seat-height adjusting lever around the hinge shaft, so as to be received in the receiving portion of the seat-adjusting lever and rotate when adjusting an angle of a seatback; and a connecting member having an end connected to the hinge shaft and the other end joined with a connecting bar provided to a side of the seatback, the connecting member being operated by the recliner lever so as to adjust the angle of the seatback.

The connecting member includes first and second links rotatably connected to the hinge shaft and the connecting bar respectively, and a third link extending between and connected to the first and second links by connecting pins, respectively.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Hereinafter, a embodiment of the present invention will be described with reference to the accompanying drawings.

Figure 1:
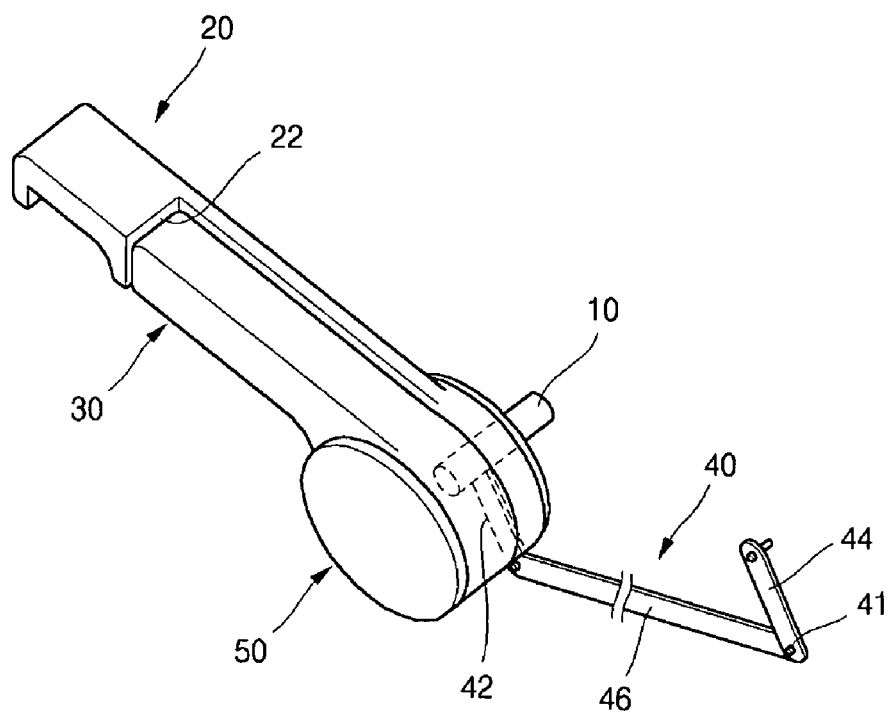
FIG. 1 is a perspective view showing a recliner lever assembly integrally assembled with a seat-height adjusting lever according to the present invention.
Figure 2:
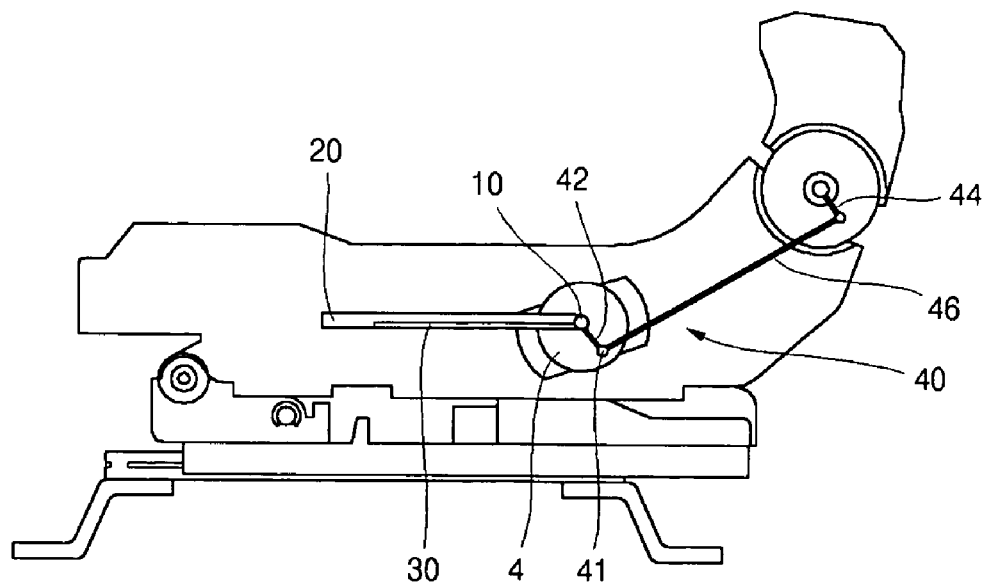
FIG. 2 is a side view showing the recliner lever assembly integrally assembled with the seat-height adjusting lever according to the present invention, in which a recliner lever is mounted on a side of a front seat.

FIG. 1 is a perspective view showing a recliner lever assembly integrally assembled with a seat-height adjusting lever according to the present invention.

Referring to FIG. 1, a pumping type seat-height adjusting lever 20 is installed to a lower portion of a seat frame of a front-seat for a vehicle so as to be capable of being rotated around a hinge shaft 10. Further, the seat-height adjusting lever 20 has a receiving portion 22 longitudinally formed at a side thereof.

The seat-height adjusting lever 20 has a pull at a leading end thereof, so that a driver or a passenger can grasp and handle the pull.

A recliner lever 30 of the recliner lever assembly is connected to the hinge shaft 10 and received in the receiving portion 22 of the seat-height adjusting lever 20, in order to rotate when the driver or the passenger adjusts an angle of a seatback.

The seat-height adjusting lever 20 is integrally assembled with the recliner lever 30 with the identical hinge shaft 10.

The recliner lever 30 is normally not exposed out of the seat-height adjusting lever 20 but placed in the receiving portion 22 of the seat-height adjusting lever 20. However, the recliner lever 30 can be operated outwardly even when the driver or the passenger pulls the recliner lever 30.

The recliner lever 30 is provided with a connecting member 40 having an end connected to the hinge shaft 10 and the other end joined with a connecting bar (not shown) provided at a side of the seatback. An operation of the recliner lever 30 allows the connecting member 40 to operate, so that the driver or the passenger can adjust an angle of the seatback.

The connecting member 40 includes first and second links 42 and 44 which are rotatably connected to the hinge shaft 10 and the connecting bar, respectively.

Further, a third link 46 extends between and connected to the first and second links 42 and 44 by means of link pins 41.

The first and second links 42 and 44 have an equal length, while the third link 46 has a length longer than that of the first and second links 42 and 44.

A cap plate 50 is provided at a side of the recliner lever 30 connected to the hinge shaft 10. The cap plate 50 is installed so as to cover and hide the hinge shaft 10 to which the recliner lever 30 is coupled and an interior of the recliner lever 30 to which the cap plate 50 is mounted.

Hereinafter, an operation of the recliner lever assembly integrally assembled with the seat-height adjusting lever according to the present invention will be described in detail with reference to drawings.

Figure 3:
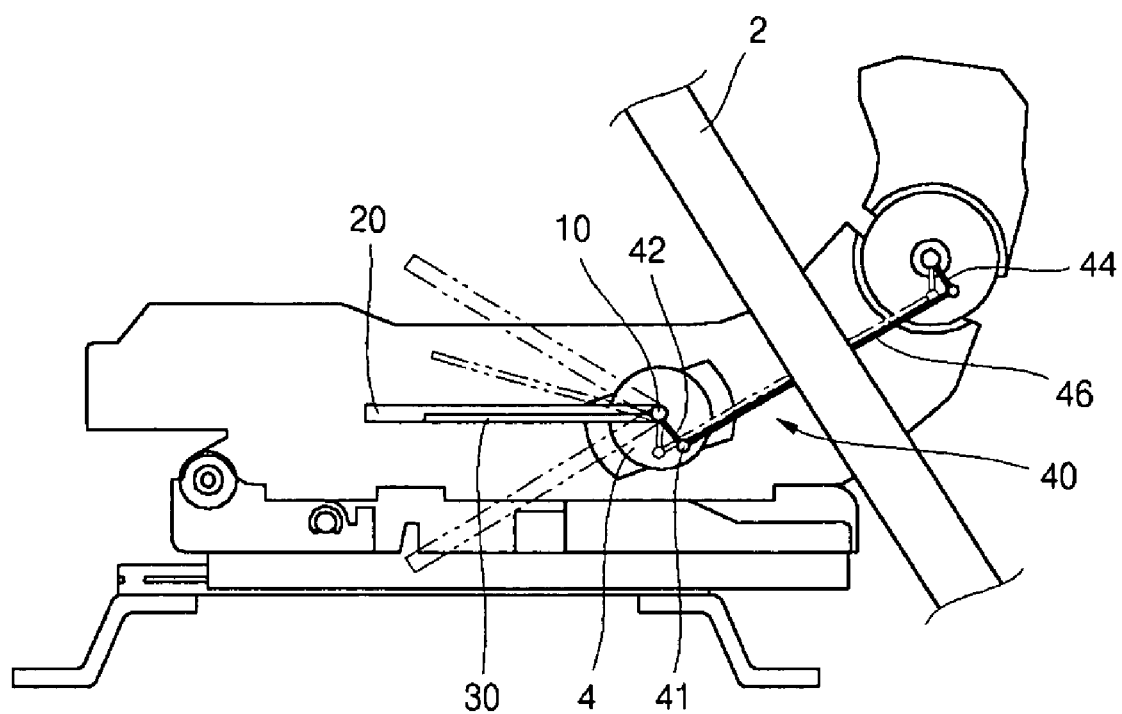
FIG. 3 is a view illustrating an operation of the recliner lever assembly integrally assembled with the seat-height adjusting lever according to the present invention.

Referring to FIG. 3, a normal state of the recliner lever 30 is shown by a solid line, while the operation state of the recliner lever 30 is shown by a dotted line.

The driver or passenger seats in the front-seat of the vehicle and pulls a webbing of the seatbelt 2 so as to couple the seatbelt to a buckle for the seatbelt (not shown).

As shown in FIG. 3, the webbing of the seatbelt is placed out of a moving line of the recliner lever 30 and does not interfere with a smooth operation of the recliner lever 30.

When the recliner lever 30 placed in the receiving portion 22 of the seat-height adjusting lever 20 is pulled upwardly in order to adjust a tilt angle of the seatback, the first link 42 of the connecting member 40 coupled to the hinge shaft 10 rotates to a position shown by a dotted-line.

When the first link 42 moves at a position shown by the dotted-line, the third link 46 connected to the first link 42 is moved in forward direction by a distance in proportion with the rotation of the first link 42, so as to rotate the second link 44 which is connected to the connecting bar of the seatback by the rotation of the first link 42.

As the recliner lever 30 operates in the state shown by the dotted-line, the connecting member 40 is also placed by the movement of the recliner lever 30 in the state shown by the dotted-line.

In this state, when the seat-height adjusting lever 20 operates upwardly and downwardly in order to adjust the height of a seat cushion of the front-seat, a lever bracket 4 connected to the seat-height adjusting lever 20 operates to adjust the height of the seat cushion of the front-seat.

Since the first and second links 42 and 44 have equal length, the movement of the recliner lever 30 can be accurately transferred to the connecting bar.

The connecting member 40 has a link mechanism because it is most effective in transferring the movement in a certain range. The link mechanism may be substituted with another mechanism.

Even in the case of the car accident occurring, the seatbelt 2 normally restrains the driver's or the passenger's body so that the webbing of the seatbelt 2 does not wind about or is not placed between the recliner lever 30 and the seat cushion of the front-seat. Thus, the recliner lever 30 is hardly operated by the webbing of the seatbelt 2, thereby preventing the driver or the passenger from being injured.

As described above, the recliner lever associated with the seat-height adjusting lever has an advantage in that even though the driver or the passenger is seated in the front-seat to operate the recliner lever in order to adjust the tilt angle of the seatback, it is possible to prevent the webbing of the seatbelt from interfering with the recliner lever.

Furthermore, even when the car accident occurs, the webbing of the seatbelt does not operate the recliner lever and wind about the recliner lever, thereby preventing the driver or the passenger from being injured.

While a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A recliner lever assembly for a front-seat of a vehicle, the recliner lever assembly comprising:
   a hinge shaft;
   a seat-height adjusting lever configured to be installed at a lower portion of a seat frame of the front-seat of the vehicle, the seat-height adjusting lever being rotatable around the hinge shaft, and comprising a receiving portion;
   a recliner lever integrally assembled with the seat-height adjusting lever around the hinge shaft, so as to be received in the receiving portion of the seat-height adjusting lever and rotate when an angle of a seatback of the seat is adjusted;
   a connecting bar configured to be attached to a side of the seatback; and
   a connecting member comprising a first end connected to the hinge shaft and a second end attached to the connecting bar, the connecting member being operable by the recliner lever so as to adjust the angle of the seatback.

2. The recliner lever assembly for a front-seat of a vehicle as claimed in claim 1, wherein the connecting member comprises first and second links rotatably connected to the hinge shaft and the connecting bar respectively, and a third link extending between and connected to the first and second links by connecting pins.

3. The recliner lever assembly for a front-seat of a vehicle as claimed in claim 2, wherein the first and second links have equal lengths.

4. The recliner lever assembly for a front-seat of a vehicle as claimed in claim 1, wherein the recliner lever comprises a cap plate at an outer side thereof.

* * * * *